May 12, 1942.   F. M. CLARK   2,282,937
PREVENTION OF CORROSION IN ELECTRIC CAPACITORS
Filed Oct. 2, 1940
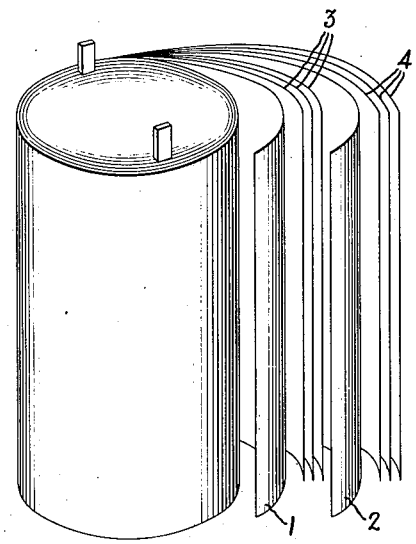
CORROSION REDUCED BY SUBSTANCE YIELDING FREE PO₄ IONS.
Inventor:
Frank M. Clark,
by *Harry E. Dunham*
His Attorney.

Patented May 12, 1942

2,282,937

UNITED STATES PATENT OFFICE 2,282,937

PREVENTION OF CORROSION IN ELECTRIC CAPACITORS

Frank M. Clark, Pittsfield, Mass., assignor to General Electric Company, a corporation of New York Application October 2, 1940, Serial No. 359,410

9 Claims. (Cl. 175—41)

The present invention relates to liquid compositions which are suitable for use in electric capacitors, cables, or other electric apparatus. It is the object of my invention to eliminate or reduce corrosion of metal parts in such devices.

In my prior Patents 1,966,163, patented July 10, 1934, and 2,244,387, patented June 3, 1941, are described electric capacitors containing compositions having electrical resistivities within the range of $10^6$ to $10^8$ ohms per centimeter cubed. The electric capacitors comprise aluminum armatures separated by paper spacers which are impregnated with such compositions.

The preferred compositions comprise one or more organic phosphates, for example, compositions comprising tricresyl phosphate which is associated with a resistance-modifying material. One such composition is a mixture comprising by weight about 65 per cent of tricresyl phosphate and about 35 per cent cresol. Another capacitor-impregnating composition illustrative of the class to which my invention is applicable consists by weight of 25 per cent tricresyl phosphate and 75 per cent of tributyl phosphate. Capacitors containing kraft paper spacers impregnated with the latter composition have a high capacity and are substantially unaffected by temperature changes over an operating range of 25 to 75° C.

It has been found, however, that capacitors containing a composition of relatively low resistivity, especially when operated at elevated temperatures, may be subject to corrosion of the aluminum armatures. The aluminum foil not only may become corroded but in some cases eventually may become filled throughout with many tiny perforations. Such corrosion depreciates the capacitors in various ways and if unchecked will eventually result in failure of the capacitors.

The corrosion appears to be electrolytic in character and has been shown to attack the positively charged electrode or armature. As capacitors commonly are connected to alternating current circuits both armatures are attacked. Apparently a relatively low resistivity of a liquid composition in such device as an electric capacitor, by favoring electric conduction, especially at elevated temperatures, increases the possibility of electrolytic corrosion.

In accordance with my present invention, such undesirable corrosion in a capacitor, cable or other electrical device is eliminated by associating such low resistivity impregnating compositions with a substance which is capable of maintaining in such compositions phosphoric acid ($PO_4$) radicals which are effective to produce a protective film on metal surfaces which are subject to corrosion and operating the device under the usual service conditions. Phosphoric acid, or a substance which is capable of progressively generating phosphoric acid by chemical decomposition, is a suitable anti-corrosion agent. Examples of materials capable of progressively engendering phosphoric acid are various slowly decomposable phosphates such as those hereinafter enumerated.

The accompanying drawing represents somewhat conventionally and partly unrolled an electric capacitor as illustrative of one form of electric device to which the present improvement is applicable.

Mono isoamyl orthophosphate which may be used as an anti-corrosion reagent is a liquid having at 100° C. a viscosity of 117 seconds Saybolt Universal. It has a specific gravity at 15.5° C. (referred to water at the same temperature) of 1.15. Its refractive index at 25° C. is 1.43. Aniline phosphate which also may be used is prepared by the reaction of phosphoric acid and aniline, and may be used in either the composition $(C_6H_5NH_2)_2-(H_3PO_4)$ or $$(C_6H_5NH_2)-(H_3PO_4)$$

that is, the di- and mono-aniline phosphates, although the latter form is preferred. This compound is a needle-like solid, insoluble in ether but soluble in the organic phosphate compositions enumerated. Other amino phosphoric acid salts are of like utility, as, for example, the salts of $\alpha$ naphthyl amine. Likewise, other phosphorous-containing acid salts of the amines such as those of phosphorous acid and pyro phosphoric acid are of similar utility.

Impregnating compositions for capacitors, such as shown in the drawing, when containing such corrosion stabilizers in amounts as low as .1 per cent are markedly less subject to corrosion. I prefer, however, to have present in the compositions embodying my invention about 2 to 10 per cent of a stabilizer of this character. The capacitor illustrated comprises armatures 1, 2 which usually consist of aluminum foil and spacers 3, 4 which usually comprise sheets of paper. The paper and void spaces in the capacitor are impregnated with a liquid composition having an electrical resistivity within the limits of $10^6$ to $10^8$ ohms per cm.³, such as the mixture of tributyl and tricresyl phosphates heretofore mentioned and a corrosion retarder of which the following examples are illustrative.

Example 1

Orthophosphoric acid may be employed as the corrosion retardant. The amount of such acid present in the composition should be less than 5 per cent, and preferably less than 1 per cent. Greater concentrations of the acid may lead to ordinary chemical corrosion of the metal containers employed for housing capacitors. A preferred range of concentration is .015 to .25 per cent.

The following additional examples are illustrative of compositions containing corrosion retardants which function by the progressive slow generation of phosphoric acid.

Example 2

| | Per cent by weight |
|---|---|
| Tributyl phosphate | 73.5 |
| Tricresyl phosphate | 24.5 |
| Mono isoamyl-o-phosphate | 2.0 |

Example 3

Modification a—

| | Per cent by weight |
|---|---|
| Tributyl phosphate | 73.5 |
| Tricresyl phosphate | 24.5 |
| Aniline phosphate | 2.0 |

Modification b—

| | Per cent by weight |
|---|---|
| Tributyl phosphate | 74.3 |
| Tricresyl phosphate | 24.7 |
| Aniline phosphate | 1.0 |

Capacitors having armatures consisting of aluminum foil as usual which were spaced apart by two sheets of .0005 inch kraft paper and impregnated with such compositions, after having been subjected to an accelerated corrosion test at the relatively high temperature of 120° C. for 17 hours, are found to be substantially uncorroded and to be substantially unchanged in capacity and power factor.

While my invention has been described with particular reference to specific compositions, it is of general application to capacitor-impregnating compositions of relatively low resistivity which are potentially corrosive with respect to metal parts, and in particular aluminum or other metal parts capable of chemically interacting with phosphoric acid to form a protective film.

What I claim as new and desire to secure by Letters Patent of the United States is:

1. The method of preventing corrosion of metal members of an electrical device containing in operative relation to such parts a liquid composition having electrical resistivity within the limits of $10^6$ to $10^8$ ohms per cm.$^3$ which consists in associating said composition with less than 5 per cent of a substance which is capable of maintaining in said composition free $PO_4$ radicals, and subjecting said device to the usual service conditions.

2. The method of preventing corrosion of metal armatures of an electrical capacitor containing in operative relation to such parts a liquid composition having electrical resistivity within the limits of $10^6$ to $10^8$ ohms per cm.$^3$ which consists in adding to said composition less than 1 per cent of phosphoric acid, and subjecting said capacitor to the usual service conditions.

3. The method of preventing corrosion of metal armatures of an electrical capacitor containing in operative relation to such parts a liquid composition having electrical resistivity within the limits of $10^6$ to $10^8$ ohms per cm.$^3$ which consists in adding to said composition about 0.15 to .25 per cent of phosphoric acid, and subjecting such capacitor to the usual service conditions.

4. The method of preventing corrosion of paper-spaced aluminum armatures of electrical capacitors containing as an impregnant a composition of tributyl and tricresyl phosphates which consists in associating said composition with about 1 to 2 per cent of a material which is capable of engendering phosphoric acid, and subjecting such capacitors to ordinary service conditions.

5. A composition suitable for the impregnation of electric capacitors comprising mainly a liquid, stable organic phosphate compound and a minor proportion of a substance capable of maintaining in said composition free $PO_4$ ions.

6. A composition suitable for the impregnation of electric capacitors comprising a liquid, stable organic phosphate and including a fractional per cent of phosphoric acid and having electrical resistivity within the range of $10^6$ to $10^8$ ohms per cm.$^3$.

7. A composition suitable for use in electric capacitors comprising tributyl and tricresyl phosphates and no more than about 2 per cent of mono-isoamyl-o-phosphate.

8. A composition suitable for use in electric capacitors comprising tributyl and tricresyl phosphates and no more than about 2 per cent of aniline phosphate, chosen from the class consisting of the mono- and di-analine phosphate.

9. A composition suitable for the impregnation of electric capacitors comprising aluminum armatures separated by paper comprising a liquid compound chosen from the class consisting of tricresyl and tributyl phosphates and less than ten per cent of an anti-corrosion agent consisting essentially of mono-isoamyl-o-phosphate.

FRANK M. CLARK.